United States Patent [19]

Heckel et al.

[11] 4,135,060

[45] Jan. 16, 1979

[54] CIRCUIT ARRANGEMENT FOR A TIME DIVISION MULTIPLEX COMMUNICATION SYSTEM FOR THE CHANNEL BY CHANNEL COMBINATION AT THE RECEIVING END OF INFORMATION TRANSMITTED IN THE FORM OF MULTIFRAMES

[75] Inventors: Claus Heckel, Stuttgart; Dieter Wimmer, Schorndorf; Frank Knabe, Leonberg, all of Germany

[73] Assignee: International Standard Electric Corporation, New York, N.Y.

[21] Appl. No.: 862,243

[22] Filed: Dec. 19, 1977

[30] Foreign Application Priority Data

Dec. 21, 1976 [DE] Fed. Rep. of Germany ....... 2657878

[51] Int. Cl.² .......................... H04J 3/06; H04J 3/12; H04M 7/16
[52] U.S. Cl. .................................... 179/15 BY; 325/4
[58] Field of Search ......... 179/15 BY, 15 AS, 15 BA, 179/15 BS, 15 A; 325/4

[56] References Cited

U.S. PATENT DOCUMENTS

| | | |
|---|---|---|
| 3,772,475 | 11/1973 | Loffreda ................................. 325/4 |
| 3,843,927 | 10/1974 | Hanni ..................................... 325/4 |
| 3,970,799 | 7/1976 | Colton et al. ................... 179/15 BY |

Primary Examiner—Thomas A. Robinson
Attorney, Agent, or Firm—John T. O'Halloran; Alfred C. Hill

[57] ABSTRACT

To combine specific information transmitted in the form of multiframes (i.e. signalling information in TDMA) channel by channel at the receiving end, this information is written into a RAM in parallel in order of receipt. The addresses of the RAM are divided into channel and frame addresses which are stepped on independently of each other for writing and reading. Writing and reading alternate in quick succession. When the end of a multiframe is detected in a channel, this channel address is retained during reading and the signalling information of this channel, starting with the beginning of the multiframe, is read out in parallel and translated into serial form. To do this, each channel has the same sufficient time available.

7 Claims, 4 Drawing Figures

CIRCUIT ARRANGEMENT FOR A TIME DIVISION MULTIPLEX COMMUNICATION SYSTEM FOR THE CHANNEL BY CHANNEL COMBINATION AT THE RECEIVING END OF INFORMATION TRANSMITTED IN THE FORM OF MULTIFRAMES

BACKGROUND OF THE INVENTION

The present invention relates to a circuit arrangement for the channel by channel combination at the receiving end of specific information, particularly signalling information, which, distributed over m frames within the n channels of a digital time division multiplex communication system, can be transmitted in the form of multiframes.

In digital time division multiplex communication systems where n channels form a frame and where information, e.g. signalling information serving monitoring purposes, is transmitted in each channel and distributed over m frames, it is known to serially collect these bits in shift registers, separately for each channel, and to read them out as soon as a multiframe end signal for a channel is received. This readout must be completed before the multiframe end signal of another channel is received. In the worst case, this channel is the immediately following channel, so the readout time must be shorter than the minimum time interval between two successive received bits of channel information. This involves a high processing speed of the received channel information and thus requires considerably more expensive components.

SUMMARY OF THE INVENTION

It is therefore the object of the present invention to provide a circuit arrangement of the above kind which permits the received information to be processed at a slower speed.

A feature of the present invention is the provision of a circuit arrangement for the channel by channel combination at the receiving end of signalling information, which is distributed over m frames within n channels of a digital time division multiplex communication system, transmitted in the form of multiframes, where m and n are integers greater than one, comprising a random access memory having a capacity sufficient to store the signalling information from at least m frames, the signalling information being written in parallel form in the order of receipt in the memory, the address of the memory being divided into a frame address and a channel address which can be stepped on independently on each other, a clock generator which alternately determines read and write phases; a pair of changeover switches coupled to the memory and the clock generator which, during the read phases, switch frame and channel addresses to the memory which are different from those frame and channel addresses switched to the memory during the write phases; a channel write address counter coupled to one of the pair of switches to determine the channel address to be switched to the memory by the one of the pair of switches during a write phase, the write address counter being reset by a frame clock of the arrangement and advanced with each received channel; a channel read address counter coupled to the one of the pair of switches to determine the channel address to be switched to the memory by the one of the pair of switches during a read phase, the read address counter being reset by the frame clock and advanced n times during each frame period at regular time intervals; a frame address counter coupled to the other of the pair of switches to determine the frame address to be switched to the memory by the other of the pair of switches during a writing phase, the frame address counter being advanced by the frame clock; first means coupled to the frame address counter to reduce the frame address coupled to the memory by a fixed amount during the write phase until a multiframe end of signal is detected in a channel of a frame during a read phase; second means coupled to the frame address counter and set to increase step by step the frame address, beginning with the frame address marking the beginning of a multiframe, up to the detected frame address marking the end of the multiframe; and third means coupled to the memory to extract information so addressed by the frame address marking the end of the multiframe from the memory in parallel and to translate the extracted information into serial form before the channel address to be coupled to the memory is increased.

BRIEF DESCRIPTION OF THE DRAWINGS

The above-mentioned and other features and objects of this invention will become more apparent by reference to the following description taken in conjunction with the accompanying drawing, in which.

DESCRIPTION OF THE PREFERRED EMBODIMENT

The embodiment described in the following relates to a specific time division multiplex system, namely, to a time division multiple access (TDMA) system. However, the invention is generally applicable to time division multiplex systems wherein specific information of a channel is distributed over several frames and transmitted in the form of a multiframe and must be recombined at the receiving end. To clarify the terms used, it should be emphasized that the time slots of the TDMA system described here correspond to the channels of a general division multiplex system, while the bursts transmitted by the earth stations during the time slots correspond to the channel information.

Figure 1:
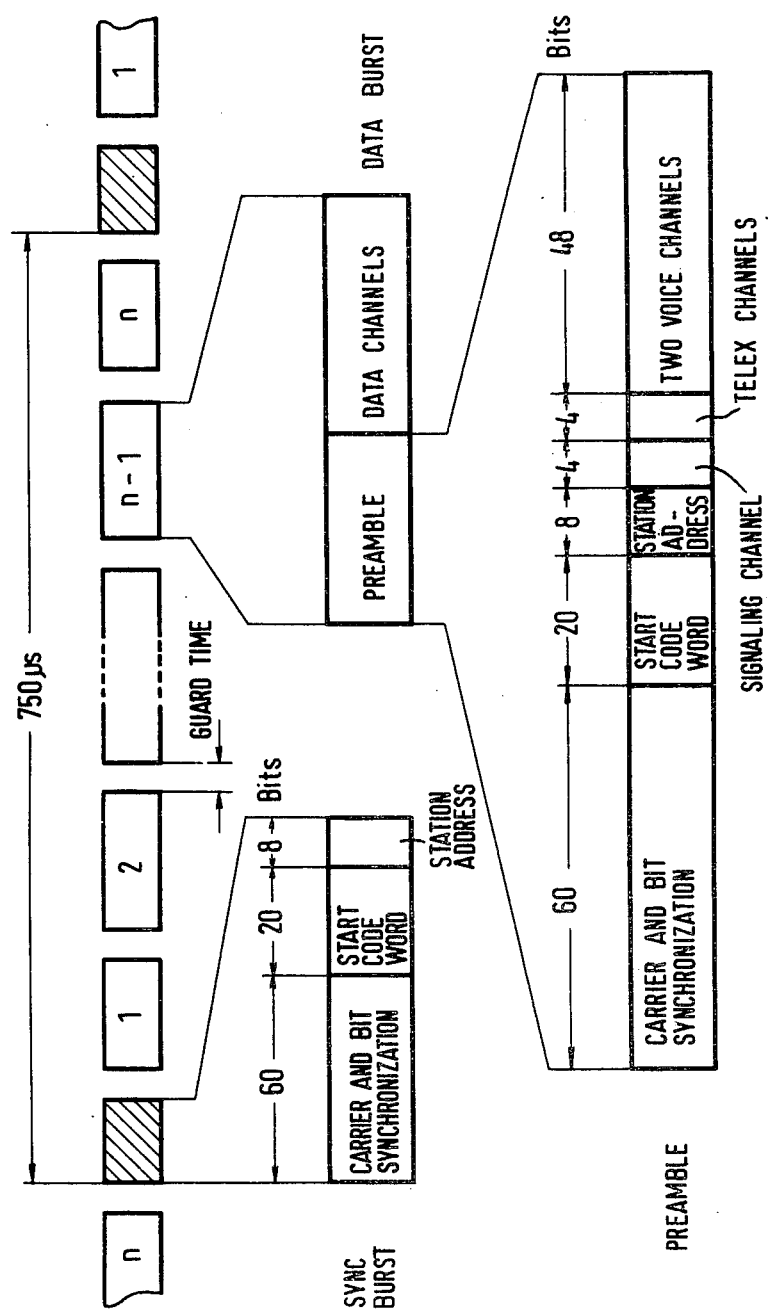
FIG. 1 shows the frame format of a time division multiple access system.

FIG. 1 shows the frame format of a TDMA system comprising n earth stations. During a 750-$\mu$s (microsecond) frame period, each station transmits its information to the satellite once in a given time slot assigned to it in such a way that the information transmitted by the n stations arrives at the satellite in succession and does not overlap there in time. The beginning of a frame is formed by a sync burst which is transmitted by one of the stations and with which the n stations synchronize the transmission of their information, hereinafter referred to as "data bursts". Each data burst begins with the preamble, which is followed by the information bits from the data channels connected to this station. The preamble contains 60 bits for the carrier and bit timing recovery, 20 bits for the unique word, 8 bits for the station identification code, 4 bits for a signalling channel, 4 bits for telex channels and 48 bits for two voice channels.

In the following, only the signalling channel will be considered, since the invention serves specifically to process at the receiving end the signalling information for the control and monitoring of system functions of the different earth stations.

A word of this signalling information consists of 40 bits, so 10 frames are needed to transmit one complete word of 10·4 = 4 bits. That burst which contains the last 4 bits of the 40-bit signalling word of this channel is marked by the fact that its start code is transmitted in inverted form. An inverted start code word thus represents a multiframe end signal in the respective channel.

Since each station receives the bursts transmitted by each of the other stations, it must check whether the signalling information contained in the respective burst is addressed to it. The 40-bit words distributed over multiframes of 10 frames must therefore be combined at the receiving end.

The circuit arrangement provided for this purpose (FIG. 2) is suited for a TDMA system with a maximum of 15 stations or channels, i.e., within the 750-μs frame, a maximum of 15 bursts arrives at the satellite (n=15). Since a signalling word of a station is distributed over 10 frames, it is necessary to store the signalling bits from the 15 bursts of a frame over 10 frames, i.e., a memory is needed which is capable of storing at least 10·15 = 150 4-bit words. The present circuit arrangement uses a random access memory (20) with a capacity of 256 5-bit words. Four of each of these 5-bit words serve to store the four signalling bits per burst of each frame, and the fifth bit is used to mark the end of the multiframe. With each received burst containing signalling information, the four signalling bits a, b, c, d and the bit UE, which indicates whether or not these four signalling bits are the last of a signalling word, are transferred in parallel from devices not shown to 5 inputs of the memory 20. The multiframe end bit UE previously passes through an AND gate 21, whose operation will be explained below. Via 8 address inputs A1 to A8, the memory 20 is fed with the word address in the form of an 8-digit binary number ($2^8 = 256$) which specifies one of the 256 cells into which the 5 bits of a burst are written or from which these 5 bits are read out.

To arrange the incoming words according to channel and frame, the whole address A1 to A8 is divided into two groups. The bits A1 to A4 determine the frame address, and the bits A5 to A8 the channel address.

The signalling bits can thus be stored over 16 frames, with 16 channel addresses contained in each frame. However, since only 15 bursts, i.e. 15 channels, are present, the highest channel address, i.e. 16, remains free.

Figure 2:
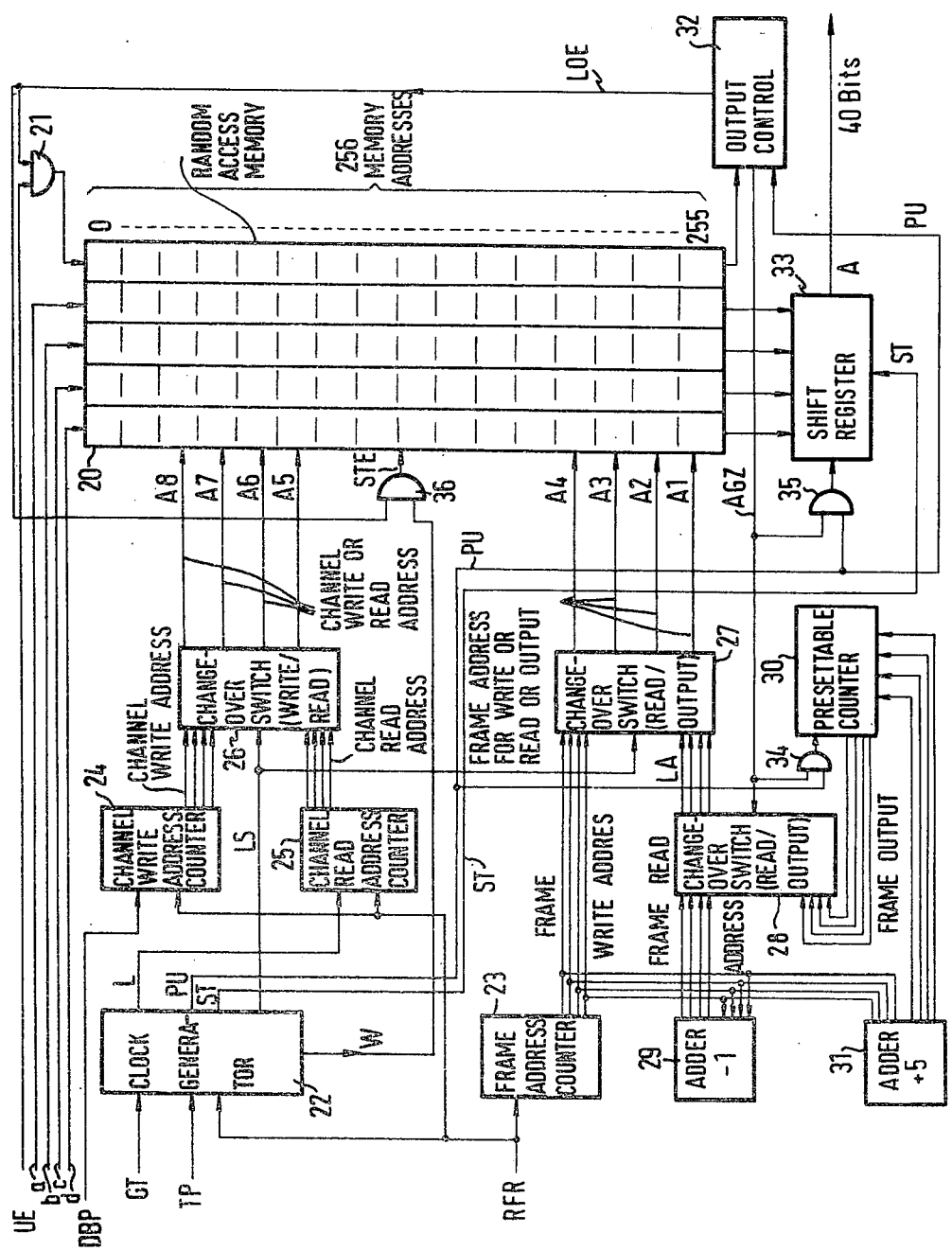
FIG. 2 is a block diagram of the circuit arrangement according to the principles of the present invention.

The units controlling the memory 20 of FIG. 2 will now be explained in connection with FIG. 3. The circuit arrangement shown in FIG. 2 is fed with the following input signals: a clock GT derived from the symbol clock of the system and used to control a clock generator 22; a frame clock RFR each of whose pulses is derived from one sync burst; pulses DBP which are derived from one received data burst each; pulses TP which occur only when a received data burst contains signalling information; the signalling information INF as parallel bits a, b, c, d and the multiframe end bit UE.

The frame address A1 to A4 of the memory 20 is determined in dependence on a frame address counter 23. The latter is a binary counter which counts cyclically from 0 to 15 and is advanced with the frame clock RFR, i.e., at 750-μs time intervals. The frame clock RFR is also used to synchronize the clock generator 22, whose operation will be explained below, and to reset two binary counters, the channel write address counter 24 and the channel read address counter 25. The channel write address counter 24 is advanced with each of the pulses DBP and determines the channel address under which signalling information INF received with the respective burst is written into the memory 20. The channel read address counter 25 is advanced, at regular intervals, 15 times during a 750-μs frame period by a read pulse sequence L(FIG. 2) generated by the clock generator 22. The address determined thereby serves as the channel read address, as will be described below.

The write and read phases of the memory 20, i.e. the times during which information can be written into and read from the memory, are determined by the clock generator 22 as follows. It divides each cycle of the read pulse sequence L into 15 like sections as is shown in FIG. 3 for the sixth cycle. From this clock pulse sequence, whose frequency is 15 times that of the read pulse sequence, the clock generator derives, in the manner shown, a clock pulse sequence LS whose duty factor is unequal to 1, and which determines the write and read phase. This clock LS controls a changeover switch 26 in such a way that the latter switches through the channel read address appearing at one of its inputs during each read phase, and the channel write address appearing at its other input during each write phase, to the memory 20 as a channel address A5 to A8. In addition, the clock LS controls another changeover switch 27 so that the latter switches through the address transferred from the outputs of the frame address counter 23 to its inputs S during each write phase and the address appearing at the outputs of a third changeover switch 28 during each read phase, to the memory 20 as a frame address A1 to A4. The inputs of the changeover switch 28 are fed with a frame read address and a frame output address. To form the frame read address, an adder 29 adds the value −1 to the frame write address appearing at the outputs of the frame address counter 23, taking into account the cycle 0-15-0-15. The frame output address appears at the outputs of a presettable counter 30 which is set by means of an adder 31 to a value preceding the frame write address in the cycle from 0 to 15 by 5 counts. The write phase is three times as long as the read phase. Thus, when the frame write address has the value 3, the adder 31 provides the value 8; when it has the value 13, the adder 31 provides the value 2. In the "normal case", the changeover switch 28 is held in the "read" state by a control signal provided by an output control 32 to be described below.

So far it has been explained which addresses appear at the address inputs of the memory 20 at what times, but it has not yet been said what effects these addresses have.

Whether the memory 20 writes the bits at its parallel inputs under the currently applied address or switches through the 5 bits stored in the cell specified by this address to its parallel outputs depends on the state of a control signal appearing at a control input STE. As long as this signal is positive, the memory is in the "read" state, so the contents addressed during the write and read phases are switched through to the outputs. From there, the 4 information bits are applied to 4 parallel inputs of a shift register 33, and the fifth bit UE, which indicates whether the other four bits form the end of a multiframe, is applied to one input of the output control 32.

Additional signals supplied by the clock generator 22, which have not been explained so far, serve to switch the memory from "read" to "write" and to timely process the information appearing at the memory outputs during the "read" state.

The clock generator 22 generates a clock-pulse sequence PU (FIG. 3) whose repetition rate is equal to that of the clock-pulse sequence LS, which determines the read and write phases. It also provides a clock-pulse sequence ST whose repetition frequency is four times that of PU.

As mentioned above, the clock generator 22 is fed with a pulse TP whenever a just received burst contains signalling information (INF) which is available at the inputs of the memory in order to be read in.

If this pulse TP falls within a write phase, the clock generator will, during this write phase, provide, together with the next pulse ST, a negative write pulse W during which the input information is written under the write address applied at that time. If, however, the pulse TP falls within a read phase, the write pulse will only be delivered in the subsequent write phase. This ensures that each bit of input information is transferred into the memory without the reading being disturbed by the writing. Therefore, the writing can be left out of account in the following description.

The information switched to the outputs of the memory 20 is evaluated as follows. The output control 32 normally provides on its output line AGZ a negative potential which, as mentioned above, holds the changeover switch 28 in the "read" state.

This negative potential also inhibits AND gates 34 and 35 to prevent the passage of the positive clock pulses PU, which appear during each read phase. As long as these clock pulses PU are prevented from reaching the shift register 33 and the presettable counter 30, the four parallel bits are not transferred from the output of the memory to the shift register 33, and the presettable counter remains at the count determined by the adder 31.

In addition to the multiframe end bit UE, the clock pulse sequence PU is fed into the output control 32. If, during a frame period, the channel read addresses are switched from 0 to 15 as described and with the frame read address being retained, and the output control 32 discovers a multiframe end bit UE in a channel address during a read phase communicated to it by PU, the following will happen.

The output control will provide a positive signal AGZ which switches the changeover switch 28 from "read" to "output" and opens the AND gates 34 and 35 for the clock pulses PU. If, for example, the frame address counter stands at 5, so the frame read address is 4, and if the multiframe end was detected in the channel read address 6, the changeover switch 6 will first switch the start address 5+5 = 10 of the presettable counter 30 as a frame output address to the inputs LA of the changeover switch 27. With the next clock pulse PU, the frame address is increased to 11, and the bits stored under the frame address 11 and the channel address 6 are transferred in parallel as first bits of the 40-bit signalling word to the shift register 33. With the following clock pulses ST, which are applied as shift pulses to the shift register, these 4 bits are made available serially at the output A of the shift register. In this way, the remaining bits of this 40-bit signalling word, which are stored under the frame addresses 12 to 4 and under the channel address 6, are read out in parallel and converted to serial form before the next pulse of the read pulse sequence L increases the channel address by 1. When the multiframe end of this sixth channel of the frame is found under the channel address 4, this multiframe started at the frame address 11.

After the 40 bits have been extracted from the memory, the signal AGZ becomes negative again, so the changeover switch 28 is switched from "output" back to "read", and the clock pulses PU are blocked again. To accomplish this, the output control 32 contains a counter which, beginning with the first clock pulse PU which occurs when the signal AGZ is already positive, counts another 9 such clock pulses and then causes the signal AGZ to become negative again.

Finally it is ensured that an already evaluated bit UE is erased in the memory 20. This is done by means of negative erase pulses which the output control 32 delivers on an output line LOE only during each read phase, and there after the clock pulse PU, as long as the signal AGZ is positive and thus indicates the output time. These negative erase pulses are applied to AND gates 21 and 36 and cause negative potential to appear simultaneously at the outputs of these gates, so that during the actual read phase the memory 20 is switched to "write" for a short time and the contents of the addressed, previously read out cell are erased. If new signalling information appears at the inputs simultaneously with the erase pulses, the memory locations will be overwritten with this information. This is of no consequence for these locations since they are filled with new information prior to the next readout, and the signalling information present at the inputs is not lost, since it is transferred to another cell during the following write phase. The latter is also true if a new multiframe end bit UE which is positive appears at the input of the AND gate 21 simultaneously with a negative erase pulse.

Figure 4:
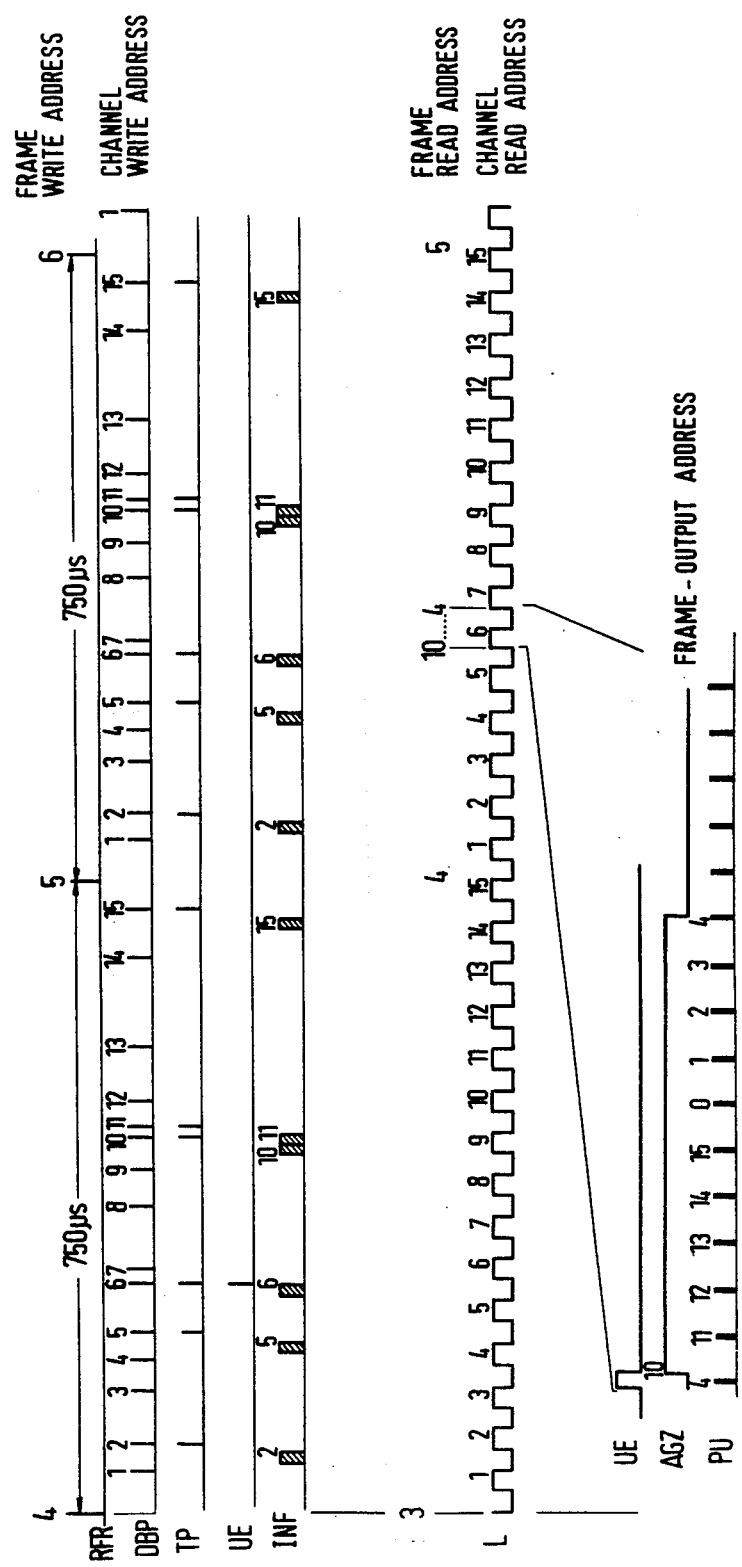
FIG. 4 shows a diagram of the addressing pulse sequences in a memory over a duration of two frame periods.

In conclusion the stepped addressing over two frame periods will be explained again with the aid of FIG. 4.

Figure 3:
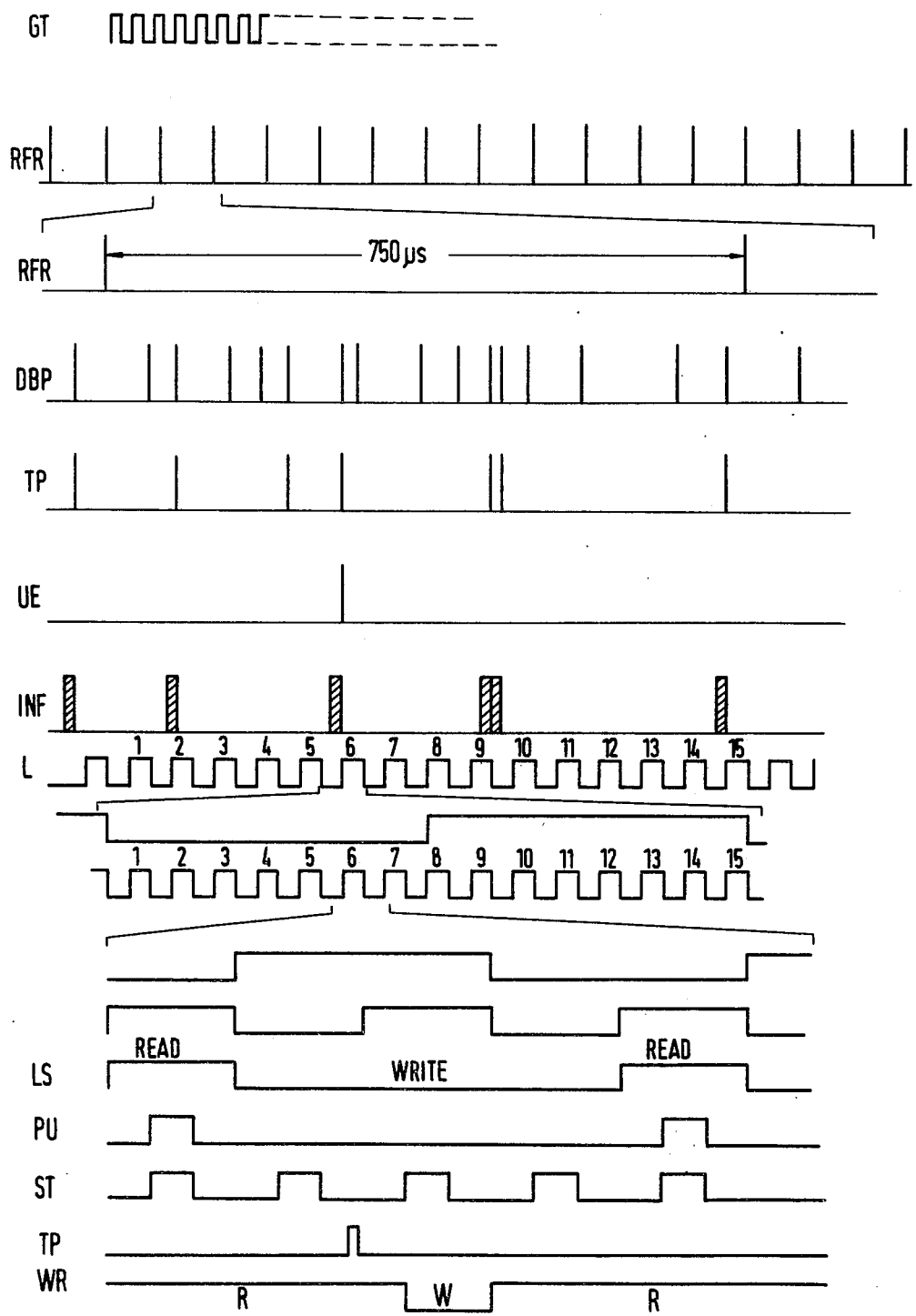
FIG. 3 is a diagram of the pulse sequences occurring in FIG. 2.

As in FIG. 3, the uppermost lines show the input signals of the circuit arrangement described, but here over two frame periods. The reference characters need not, therefore, be explained again. The sixth line shows the stepping of the frame read address and of the channel read address. Compared to the frame write address in the uppermost line, the frame read address has been decreased by 1, and unlike the channel write address, the channel read address is stepped on at regular time intervals. FIG. 4 shows the case where a positive multiframe end bit UE occurs in the sixth burst of the frame stored under the frame address 4.

If the positive multiframe end bit stored under the channel address 6 is detected during readout of the frame stored under the frame address 4, the output signal AGZ of the output control becomes positive, the frame address 11 is switched through to the memory with the first following pulse PU, and the 4 bits stored in the memory and forming the beginning of the signalling word are read out. The remainder of the signalling word is read out in the manner shown by advancing the frame read address with further pulses PU in quick succession until the frame read address 4 is reached again and the signal AGZ, indicating the output time, becomes negative again. When the next pulse of the read pulse sequence L occurs, the channel read address is increased from 6 to 7 during the frame read address 4.

As can be seen, the output time is the same for all channel signalling words and independent of the time interval in which two successive bursts are received.

While I have described above the principles of my invention in connection with specific apparatus it is to be clearly understood that this description is made only by way of example and not as a limitation to the scope of my invention as set forth in the objects thereof and the accompanying claims.

We claim:

1. A circuit arrangement for the channel by channel combination at the receiving end of signalling information, which is distributed over m frames within n channels of a digital time division multiplex communication system, transmitted in the form of multiframes, where m and n are integers greater than one, comprising:

a random access memory having a capacity sufficient to store said signalling information from at least m frames, said signalling information being written in parallel form in the order of receipt in said memory, the address of said memory being divided into a frame address and a channel address which can be stepped on independently of each other;

a clock generator which alternately determines read and write phases;

a pair of changeover switches coupled to said memory and said clock generator which, during the read phases, switch frame and channel addresses to said memory which are different from those frame and channel addresses switched to said memory during the write phases;

a channel write address counter coupled to one of said pair of switches to determine the channel address to be switched to said memory by said one of said pair of switches during a write phase, said write address counter being reset by a frame clock of said arrangement and advanced with each received channel;

a channel read address counter coupled to said one of said pair of switches to determine the channel address to be switched to said memory by said one of said pair of switches during a read phase, said read address counter being reset by said frame clock and advanced n times during each frame period at regular time intervals;

a frame address counter coupled to the other of said pair of switches to determine the frame address to be switched to said memory by said other of said pair of switches during a writing phase, said frame address counter being advanced by said frame clock;

first means coupled to said frame address counter to reduce the frame address coupled to said memory by a fixed amount during the write phase until a multiframe end of signal is detected in a channel of a frame during a read phase;

second means coupled to said frame address counter and set to increase step by step the frame address, beginning with the frame address marking the beginning of a multiframe, up to the detected frame address marking the end of said multiframe; and third means coupled to said memory to extract information so addressed by said frame address marking said end of said multiframe from said memory in parallel and to translate said extracted information into serial form before the channel address to be coupled to said memory is increased.

2. A circuit arrangement according to claim 1, wherein said second means includes
an adder coupled to said frame address counter, and
a presettable counter coupled to said clock generator and said adder, said presettable counter being set to an initial value derived from said adder and advanced by a clock pulse sequence from said clock generator whose repetition rate is equal to that of the clock pulse sequence determining the write and read phases.

3. A circuit arrangement according to claim 2, wherein during a writing phase said memory is addressed for writing only if said information to be written has been received with a channel.

4. A circuit arrangement according to claim 3, wherein said first means reduces said frame address by one.

5. A circuit arrangement according to claim 1, wherein during a writing phase said memory is addressed for writing only if said information to be written has been received with a channel.

6. A circuit arrangement according to claim 5, wherein said first means reduces said frame address by one.

7. A circuit arrangement according to claim 1, wherein during a writing phase said memory is addressed for writing only if said information to be written has been received with a channel.

* * * * *